United States Patent [19]
Tsuei et al.

[11] Patent Number: 5,241,853
[45] Date of Patent: Sep. 7, 1993

[54] EXHAUST FUME SAMPLING APPARATUS FOR A TWO-STROKE GASOLINE ENGINE WITH A CLOSED LOOP ENGINE CONTROL UNIT

[75] Inventors: Jin-Torng Tsuei, Taichung Shyuan; Tsung-Cheng Wang, Hsinchu; Huan-Lung Gu, HuaLian, all of Taiwan

[73] Assignee: Industrial Technology Research Institute, Taiwan

[21] Appl. No.: 806,187

[22] Filed: Dec. 13, 1991

[51] Int. Cl.⁵ .......................................... G01M 15/00
[52] U.S. Cl. ..................................... 73/116; 73/23.31
[58] Field of Search ................. 73/116, 23.31, 23.32, 73/116; 123/65 PE, 672

[56] References Cited
FOREIGN PATENT DOCUMENTS
35024 2/1987 Japan .............................. 123/65 PE

*Primary Examiner*—Jerry W. Myracle
*Attorney, Agent, or Firm*—Browdy and Neimark

[57] ABSTRACT

This invention is directed to an exhaust fume sampling apparatus for a two-stroke gasoline engine with a closed loop engine control unit. The novel exhaust fume sampling apparatus has a fume duct, a sampling valve, and a sensor. The fume duct is connected at one end thereof with a fume inlet disposed in the wall of combustion chamber and is in communication at other end thereof with the exhaust pipe of the engine. The sampling valve is disposed on the fume duct and is capable of being opened up at the moment shortly after the combustion has taken place so as to permit the exhaust fume so produced to pass therethrough to enter the sampling apparatus. The sensor can measure the oxygen content of the exhaust fume introduced into the sampling apparatus and transmit the information in reference to the measured oxygen content to the engine control unit, which regulates the supply of fuel to engine in accordance with the information it has received from the sensor so that an optimum air-fuel ratio is attained.

5 Claims, 2 Drawing Sheets

EXHAUST FUME SAMPLING APPARATUS FOR A TWO-STROKE GASOLINE ENGINE WITH A CLOSED LOOP ENGINE CONTROL UNIT

BACKGROUND OF THE INVENTION

The present invention relates to the combustion control system of a gasoline engine, and more particularly to the closed loop control device of a two-stroke gasoline engine.

The operators of the automobiles have become increasingly concerned with the operating efficiency of the cars and the air pollution brought about by the operation of the cars. That is to say that the driving public is focusing the attention on the standard of exhaust fume and the efficiency of combustion. Of course, an efficient combustion of fuel in a car engine will produce the exhaust fume which is less likely to pollute the air in our environment. Such goal can be achieved by improving the precision, with which the ratio of air and fuel mixture is controlled. The fuel supply system, either a carburetor or a fuel injection system, of the conventional two-stroke gasoline engine has two major defects, which are further expounded hereinafter.

The conventional two-stroke gasoline engine is not provided with the closed loop control device capable of automatically adjusting the air fuel ratio with precision in accordance with the quality of the exhaust fume. In addition, the efficient combustion of fuel in such engine can be adversely affected by the incidents such as the carbon deposit in exhaust holes, the dirty air filter, and the deterioration of work quality of the fuel controlling element, when such engine becomes older.

Unlike a four-stroke gasoline engine, a two-stroke gasoline engine is not provided with means which prevents the feeding process of the air-fuel mixture and the discharging process of fume from taking place almost simultaneously during the same stroke of a piston and which prevents the short circuit of the gas vapor from developing. As a result, the fume exhausted from such two-stroke gasoline engine is often combined with some of the fresh air-fuel mixture fed into the engine and is therefore not suitable to be analyzed for the purpose of determining the conditions under which air and fuel are mixed and burned in the combustion chamber so as to feed back such information for adjusting the optimum air-fuel ratio.

SUMMARY OF THE INVENTION

It is therefore the primary objective of the present invention to provide a two-stroke gasoline engine with the closed loop control device, which permits the sample of fume exhausted from the combustion chamber to be taken directly before the fresh air-fuel mixture is fed into the combustion chamber to mix with the exhaust fume still present in the combustion chamber and which allows a sensor to detect precisely the status of combustion as a basis of controlling the optimum air-fuel ratio without being meddled by the short circuit of gas vapor.

It is another objective of the present invention to provide a two-stroke gasoline engine with the closed loop control device, which is capable of detecting a poor air-fuel ratio by checking the exhaust fume by means of a sensor so as to feed back such information for the purpose of making an automatic adjustment of the fuel supply.

In keeping with the principles of the present invention, the foregoing objectives of the present invention are accomplished by the closed loop control device of two-stroke gasoline engine, which is provided with a fume sampling detector disposed by the exhaust outlet of cylinder of the two-stroke gasoline engine. The fume sampling detector is composed of a one-way or check valve having elastic element permitting only the high-pressure fume to pass therethrough at the moment immediately after the igniting of the explosive mixture in the engine cylinder has taken place. The analysis of the fume so obtained can be used to determine all the conditions of the event taking place in the combustion chamber of the engine and is carried out by a sensor arranged behind the one-way valve. Such analytical information is converted into signals, which are subsequently conveyed to the control system responsible for the chore of readjusting the air-fuel ratio on the basis of the signals received from the sensor. In addition, the signals transmitted by the sensor are used as bench marks for the self-correcting of the system irregularities of the engine so as to enhance further the precision with which the air-fuel ratio is regulated.

The foregoing structures, functions, and features of the present invention will be better understood by studying the following detailed description of the preferred embodiment, in conjunction with the drawings provided herewith.

DETAILED DESCRIPTION OF THE PREFERRED EMBODIMENT

Figure 1:
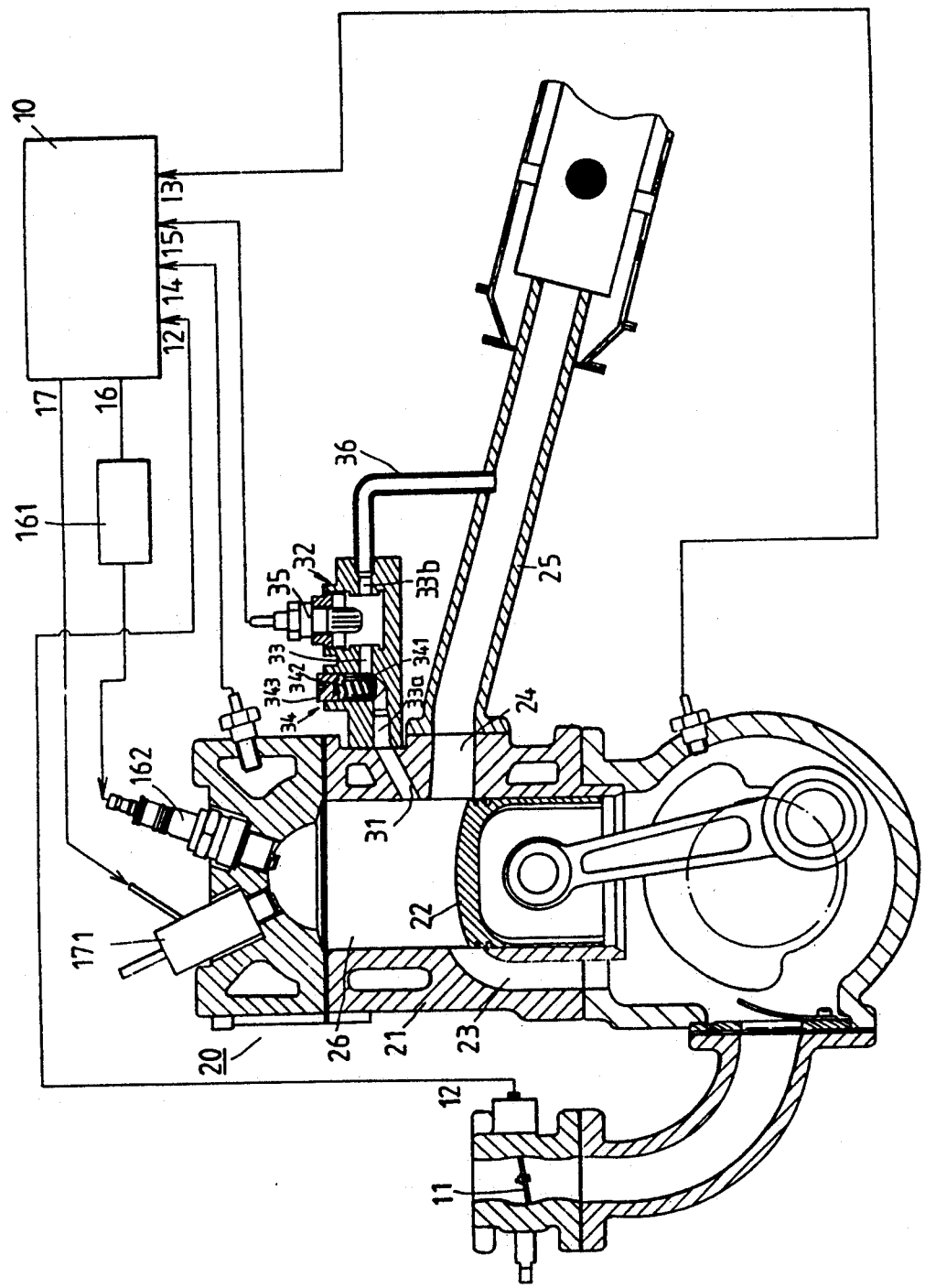
FIG. 1 shows a schematic view of the two-stroke gasoline engine provided with a closed loop control device disposed at the cylinder head of the fuel injection engine according to the present invention.

Referring to FIG. 1, the two-stroke engine embodied in the present invention is shown comprising a fuel supply system of the fuel injection type or the air-assisted fuel injection type. Such fuel supply system is provided with means capable of feeding into the engine control unit 10 the information obtained respectively from the signal line 12 detecting the extent of the opening of the throttle valve 11, the signal line 13 measuring the rate of rotation and timing of the revolving engine shaft, and the signal line 14 sensing the temperature of the cooling water. Such information is incorporated into a decision-making process carried out in the engine control unit 10, which in turn is instructed to send out the commanding signal via the signal line 16 to the transistor ignition module 161 controlling the ignition timing of the spark plug 162. In the meantime, the engine control unit 10 transmits another commanding signal via signal line 17 to the nozzle 171 regulating the quantity of fuel to be injected into the engine. In addition to such engine control unit 10, the two-stroke gasoline engine embodied in the present invention is further provided with a closed loop control device capable of transmitting to the engine control unit 10 via the signal line 15 the information concerning the status of the air-fuel ratio, which is reflected in the data of fume constituents analyzed by the sensor.

The readjustment, if any, of the air-fuel ratio is thus made on the basis of such information described above.

The closed loop control device of the two-stroke gasoline engine embodied in the present invention is further expounded hereinafter.

The cylinder 21 of the two-stroke engine 20 is provided with a piston 22 capable of being forced to make an up-and-down motion in the cylinder 21. In addition, the cylinder 21 comprises an air inlet 23 in the wall on the left and a fume outlet 24 in the wall on the right, with the former being positioned slightly and appropriately lower than the latter. The fume outlet 24 is connected to an exhaust pipe 25 through which the exhaust fume is released. Located in the cylindrical wall on the right and immediately above the fume outlet 24 is a fume inlet 31 connected to a detector 32 which is located on the side of exhaust pipe of the cylinder 21 and is composed of a fume duct 33 passing therethrough. A sampling valve 34 and a sensor 35 are disposed respectively on the fume duct 33 whose entry end 33a is coupled with the fume inlet 31 and whose exit end 33b communicates with the exhaust pipe 25 via an extension pipe 36. The sampling valve 34 is of a one-way valve and is composed of a one-way plug 341 made of ceramic or other heat resistant material and provided therein with an elastic element 342 capable of urging the plug 341 to seal the entry end 33a of the fume duct 33. Located over the elastic element 342 is a bolt 343, which serves to confine the elastic element 342 and to adjust the elastic force of the elastic element 342. Disposed on the fume duct 33 is a sensor 35 capable of sensing and measuring the content of oxygen in the exhaust fume coming out of the combustion chamber 26. Accordingly, the status of the air-fuel ratio in the combustion chamber 26 can be determined on the basis of the oxygen content in the exhaust fume measured by the sensor 35.

It must be pointed out here that the status of air-fuel ratio can not be accurately determined by measuring the oxygen content in the exhaust fume coming out of the exhaust pipe 25, because such exhaust fume is mixed with the air which is bypassed to enter the fume outlet 24 of the exhaust pipe 25. The situation of such short circuit of the air develops in view of the facts that both air inlet 23 and fume outlet 24 are located at the positions corresponding to the lower dead center of the piston 22, and that the air drawn into the combustion chamber 26 via the air inlet 23 forces the exhaust fume to enter the fume outlet 24 each time when the piston 22 travels to its lower dead center.

The operation of the closed loop control device of the two-stroke gasoline engine of the present invention is described in detail hereinafter.

Figure 2:
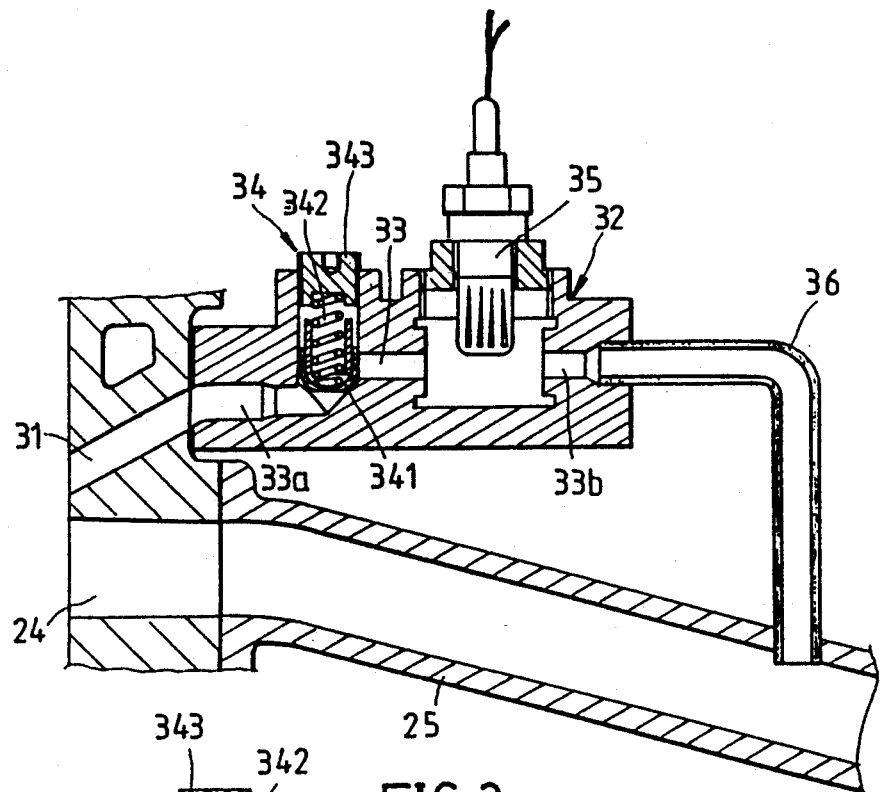
FIG. 2 shows an enlarged schematic view of the fume sampling detector as shown in FIG. 1.
Figure 3:
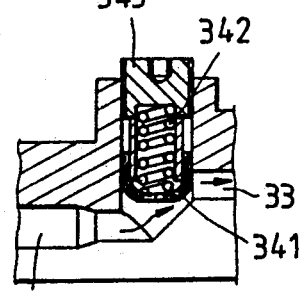
FIG. 3 is an enlarged schematic view of a portion of the fume sampling detector, as shown in FIG. 2, exhibiting the high-pressure exhaust fume acting to open up the sampling valve.

The elastic element 342 of the sampling valve 34 is provided with an elastic force of a predetermined magnitude. As the piston 22 is in the process of moving to the lower range of its movement, the fume inlet 31 is opened first, the fume outlet 24 is subsequently opened, and the air inlet 23 is the last one to be opened. In other words, the force of the high-pressure exhaust fume in the combustion chamber 26 opens up the one-way plug 341 of the sampling valve 34 when the downward movement of the piston 22 is in progress. As a result, the exhaust fume is permitted to pass through the fume duct 33 via the fume inlet 31, as shown in FIG. 3. The exhaust fume drawn into the fume duct 33 is introduced into the detector 32 and is then checked by the sensor 35. As soon as the air enters the combustion chamber 26, the pressure in the combustion chamber 26 decreases, resulting in an immediate shut-off of the sampling valve 34. On the other hand, the pressure in the combustion chamber 26 is too weak to open up the sampling valve 34 when the piston 22 is moving back up to the upper range of its movement, as shown in FIG. 2. It must be pointed out here that the opening and the closing of the sampling valve 34 are dependent on the relationships among the elastic force of the elastic element 342, the pressure of the exhaust fume drawn into the fume inlet 31, and the pressure of exhaust fume in the extension pipe 36. In other words, the sampling valve 34 is opened up when the pressure of the exhaust fume drawn into the fume inlet 31 is greater than the sum of pressures of elastic element 342 and of the exhaust fume in the extension pipe 36.

Figure 4:
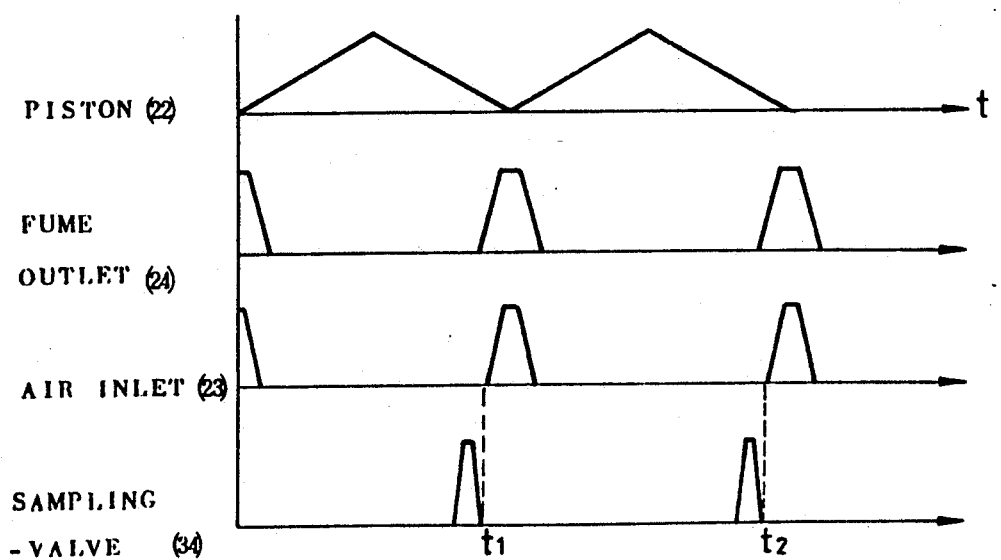
FIG. 4 is a schematic diagram showing the time-sequence relationships among the opening and closing actions of the fume sampling valve, entry of air, and exit of the air.

The working relationships among the fume outlet 24, the air inlet 23, the sampling valve 34, and the piston 22 are illustrated in FIG. 4. The sampling valve 34 is closed at the time t1 when the air inlet 23 is opened up to allow the air to enter therethrough. For this reason, the sample of exhaust fume obtained from the sampling valve 34 serves to represent accurately the status of combustion inside the combustion chamber 26, and such sample is therefore a suitable one to be analyzed for its contents by the sensor 35 so as to determine if the air-fuel ratio in the combustion chamber 26 is appropriate. Such instructional information concerning the air-fuel ratio is subsequently transmitted to the engine control unit 10, which makes an appropriate adjustment in the quantity of fuel to be injected into the engine so that an optimum air-fuel ratio is attained. The sampled exhaust fume is eventually released into the exhaust pipe 25 via an extension pipe 36.

The embodiment of the present invention described above is to be considered in all respects as merely illustrative and not restrictive. Accordingly, the present invention may be embodied in other specific forms without deviating from the spirit thereof. For examples, the one-way valve used in the embodiment of the present invention described above may be replaced by an induction valve or a crank-actuated mechanical means. In addition, the fume inlet 31 of the fume duct 33 can be disposed in that portion of the exhaust pipe 25 which is adjacent to the cylinder 21. Therefore, the present invention is to be limited only by the scope of the hereinafter appended claims.

What I claim is:

1. An exhaust fume sampling apparatus for a two-stroke gasoline engine having a closed loop engine control unit, said sampling apparatus comprising:
   (a) a fume inlet adjacent to the fume outlet of the exhaust pipe;
   (b) a fume detector provided therein with a traversing fume duct having an entry end and an exit end, with said entry end connected with said fume inlet;
   (c) a sampling valve provided therein with a biasing means and disposed in said fume duct of said detector; and
   (d) a sensor located on said fume duct and just behind said sampling valve, and provided with means to analyze the constituents of the exhaust fume introduced thereinto and to transmit to said engine control unit the signal in reference to the analyzed information on the constituents of said exhaust fume.

2. A sampling apparatus according to claim 1, wherein said sampling valve is of a one-way valve comprising therein a one-way plug urged against by said biasing means at said entry end of said fume duct.

3. A sampling apparatus according to claim 1, wherein said fume inlet is disposed above said fume outlet of said exhaust pipe.

4. A sampling apparatus according to claim 1, wherein said detector is an oxygen detector.

5. A sampling apparatus according to claim 1, wherein said sampling valve is an induction valve.

* * * * *